US008263953B2

(12) United States Patent
Fomenkov et al.

(10) Patent No.: US 8,263,953 B2
(45) Date of Patent: Sep. 11, 2012

(54) SYSTEMS AND METHODS FOR TARGET MATERIAL DELIVERY PROTECTION IN A LASER PRODUCED PLASMA EUV LIGHT SOURCE

(75) Inventors: Igor V. Fomenkov, San Diego, CA (US); William N. Partlo, Poway, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 13/075,500

(22) Filed: Mar. 30, 2011

(65) Prior Publication Data

US 2011/0248191 A1 Oct. 13, 2011

Related U.S. Application Data

(60) Provisional application No. 61/342,179, filed on Apr. 9, 2010.

(51) Int. Cl.
*H01J 35/00* (2006.01)
*G21G 5/00* (2006.01)
*G01J 3/10* (2006.01)

(52) U.S. Cl. ............ 250/504 R; 250/493.1; 369/112.01; 369/121

(58) Field of Classification Search .............. 250/504 R; 369/112.01, 121
See application file for complete search history.

(56) References Cited

U.S. PATENT DOCUMENTS

| | | | | |
|---|---|---|---|---|
| 5,360,165 | A | 11/1994 | Singhal | |
| 5,897,307 | A | 4/1999 | Chang | |
| 6,862,339 | B2 * | 3/2005 | Richardson | 378/119 |
| 6,972,421 | B2 | 12/2005 | Melnychuk et al. | |
| 7,087,914 | B2 | 8/2006 | Akins et al. | |
| 7,161,163 | B2 * | 1/2007 | Gaebel et al. | 250/504 R |
| 7,164,144 | B2 * | 1/2007 | Partlo et al. | 250/504 R |
| 7,217,940 | B2 * | 5/2007 | Partlo et al. | 250/504 R |
| 7,250,621 | B2 * | 7/2007 | Gaebel et al. | 250/504 R |
| 7,309,871 | B2 * | 12/2007 | Bowering | 250/504 R |
| 7,361,918 | B2 * | 4/2008 | Akins et al. | 250/504 R |
| 7,368,742 | B2 * | 5/2008 | Hergenhan et al. | 250/504 R |
| 7,372,056 | B2 | 5/2008 | Bykanov et al. | |
| 7,372,057 | B2 | 5/2008 | Gaebel et al. | |
| 7,388,220 | B2 * | 6/2008 | Fomenkov et al. | 250/504 R |
| 7,391,851 | B2 * | 6/2008 | Richardson | 378/119 |
| 7,405,416 | B2 * | 7/2008 | Algots et al. | 250/493.1 |
| 7,439,530 | B2 | 10/2008 | Ershov et al. | |
| 7,449,703 | B2 * | 11/2008 | Bykanov | 250/504 R |
| 7,465,946 | B2 * | 12/2008 | Bowering et al. | 250/504 R |
| 7,476,884 | B2 * | 1/2009 | Gaebel et al. | 250/504 R |
| 7,491,954 | B2 * | 2/2009 | Bykanov et al. | 250/504 R |

(Continued)

OTHER PUBLICATIONS

U.S. Appl. No. 61/069,818, filed Mar. 17, 2008.

(Continued)

*Primary Examiner* — David A Vanore
(74) *Attorney, Agent, or Firm* — Cymer, Inc.

(57) ABSTRACT

A device is disclosed herein which may comprise a chamber, a source providing a stream of target material droplets delivering target material to an irradiation region in the chamber along a path between a target material release point and the irradiation region, a gas flow in the chamber, at least a portion of the gas flowing in a direction toward the droplet stream, a system producing a laser beam irradiating droplets at the irradiation region to generate a plasma producing EUV radiation, and a shroud positioned along a portion of said stream, said shroud having a first shroud portion shielding droplets from said flow and an opposed open portion.

21 Claims, 4 Drawing Sheets

U.S. PATENT DOCUMENTS

| | | | | |
|---|---|---|---|---|
| 7,576,343 | B2 * | 8/2009 | Tomie | 250/504 R |
| 7,598,509 | B2 * | 10/2009 | Ershov et al. | 250/504 R |
| 7,599,470 | B2 * | 10/2009 | Kloepfel et al. | 378/119 |
| 7,655,925 | B2 | 2/2010 | Bykanov et al. | |
| 7,671,349 | B2 | 3/2010 | Bykanov et al. | |
| 7,838,854 | B2 * | 11/2010 | Algots et al. | 250/504 R |
| 7,843,632 | B2 | 11/2010 | Bowering | |
| 7,872,245 | B2 * | 1/2011 | Vaschenko et al. | 250/492.2 |
| 7,897,947 | B2 * | 3/2011 | Vaschenko | 250/504 R |
| 8,003,962 | B2 * | 8/2011 | Someya et al. | 250/504 R |
| 8,017,924 | B2 * | 9/2011 | Bykanov et al. | 250/504 R |
| 8,067,756 | B2 * | 11/2011 | Ueno et al. | 250/504 R |
| 8,158,960 | B2 * | 4/2012 | Vaschenko et al. | 250/504 R |
| 8,164,076 | B2 * | 4/2012 | Endo et al. | 250/504 R |
| 2002/0053577 | A1 | 5/2002 | Maas et al. | |
| 2006/0081726 | A1 * | 4/2006 | Gerondale | 239/590 |
| 2006/0219957 | A1 * | 10/2006 | Ershov et al. | 250/504 R |
| 2006/0255298 | A1 | 11/2006 | Bykanov et al. | |
| 2007/0145078 | A1 | 6/2007 | Cohen et al. | |
| 2009/0154642 | A1 * | 6/2009 | Bykanov et al. | 378/34 |
| 2010/0019173 | A1 * | 1/2010 | Someya et al. | 250/496.1 |

OTHER PUBLICATIONS

Blaine R. Copenheaver, officer of the International Searching Authority, issued International Search Report in related application PCT/US11/0390981, dated Jul. 5, 2011, 2 pages.

Blaine R. Copenheaver, officer of the International Searching Authority, issued Written Opinion in related application PCT/US11/0390981, dated Jul. 5, 2011, 4 pages.

* cited by examiner

SYSTEMS AND METHODS FOR TARGET MATERIAL DELIVERY PROTECTION IN A LASER PRODUCED PLASMA EUV LIGHT SOURCE

CROSS-REFERENCE TO RELATED APPLICATIONS

This application claims the benefit of U.S. Provisional Patent Application Ser. No. 61/342,179, filed on Apr. 9, 2010, the contents of which are hereby incorporated by reference herein.

The present application is related to U.S. Ser. No. 12/214,736, filed on Jun. 19, 2008, entitled SYSTEMS AND METHODS FOR TARGET MATERIAL DELIVERY IN A LASER PRODUCED PLASMA EUV LIGHT SOURCE, now U.S. Pat. No. 7,872,245, issued on Jan. 18, 2011, which claims priority to U.S. Provisional Patent Application Ser. No. 61/069,818, entitled SYSTEMS AND METHODS FOR TARGET MATERIAL DELIVERY IN A LASER PRODUCED PLASMA EUV LIGHT SOURCE, filed on Mar. 17, 2008, the disclosures of each of which are hereby incorporated by reference herein.

FIELD

The present disclosure relates to extreme ultraviolet ("EUV") light sources that provide EUV light from a plasma that is created from a target material and collected and directed to an intermediate region for utilization outside of the EUV light source chamber, e.g., by a lithography scanner/stepper.

BACKGROUND

Extreme ultraviolet light, e.g., electromagnetic radiation having wavelengths of around 50 nm or less (also sometimes referred to as soft x-rays), and including light at a wavelength of about 13.5 nm, can be used in photolithography processes to produce extremely small features in substrates, e.g., silicon wafers.

Methods to produce a directed EUV light beam include, but are not necessarily limited to, converting a material into a plasma state that has at least one element, e.g., xenon, lithium or tin, with one or more emission lines in the EUV range. In one such method, often termed laser-produced-plasma ("LPP"), the required plasma can be produced by irradiating a target material having the required line-emitting element, with a laser beam.

One particular LPP technique involves generating a stream of target material droplets and irradiating some or all of the droplets with laser light pulses, e.g. zero, one or more pre-pulse(s) followed by a main pulse. In more theoretical terms, LPP light sources generate EUV radiation by depositing laser energy into a target material having at least one EUV emitting element, such as xenon (Xe), tin (Sn) or lithium (Li), creating a highly ionized plasma with electron temperatures of several 10's of eV. The energetic radiation generated during de-excitation and recombination of these ions is emitted from the plasma in all directions. In one common arrangement, a near-normal-incidence mirror (often termed a "collector mirror") is positioned at a relatively short distance, e.g., 10-50 cm, from the plasma to collect, direct (and in some arrangements, focus) the light to an intermediate location, e.g., a focal point. The collected light may then be relayed from the intermediate location to a set of scanner optics and ultimately to a wafer. To efficiently reflect EUV light at near normal incidence, a mirror having a delicate and relatively expensive multi-layer coating is typically employed. Keeping the surface of the collector mirror clean and protecting the surface from plasma-generated debris has been one of the major challenges facing BUY light source developers.

In quantitative terms, one arrangement that is currently being developed with the goal of producing about 100 W at the intermediate location contemplates the use of a pulsed, focused 10-12 kW $CO_2$ drive laser which is synchronized with a droplet generator to sequentially irradiate about 10,000-200,000 tin droplets per second. For this purpose, there is a need to produce a stable stream of droplets at a relatively high repetition rate (e.g., 10-200 kHz or more) and deliver the droplets to an irradiation site with high accuracy and good repeatability in terms of timing and position over relatively long periods of time.

For LPP light sources, it may be desirable to use one or more gases in the chamber for ion-stopping, debris mitigation, optic cleaning and/or thermal control. In some cases these gases may be flowing, for example, to move plasma generated debris, such as vapor and/or microparticles in a desired direction, move heat toward a chamber exit, etc. In some cases, these flows may occur during LPP plasma production. For example, see U.S. Ser. No. 11/786,145, filed on Apr. 10, 2007, now U.S. Pat. No. 7,671,349, issued on Mar. 2, 2010, hereby incorporated by reference herein. Other setups may call for the use of non-flowing, i.e., static or nearly static, gases. The presence of these gasses, whether static or flowing and/or the creation/existence of the LPP plasma may alter/effect each droplet as it travels to the irradiation region adversely affecting droplet positional stability.

In U.S. Ser. No. 12/214,736, filed on Jun. 19, 2008, entitled SYSTEMS AND METHODS FOR TARGET MATERIAL DELIVERY IN A LASER PRODUCED PLASMA EUV LIGHT SOURCE, 2006-0067-02, now U.S. Pat. No. 7,872,245, issued on Jan. 18, 2011, the use of a tube to envelop a portion of the droplet path as the droplets travel from a droplet release point to an irradiation region was described. As described, the tube was provided to shield and protect an optic such as a collector mirror from droplets/target material that strayed from the desired path between a droplet release point and the irradiation region, e.g. during droplet generator start-up or shutdown. However, with the use of this continuous tube, unacceptable droplet positional instabilities were observed, specifically during plasma production.

With the above in mind, applicants disclose systems and methods for target material delivery protection in a laser produced plasma EUV light source, and corresponding methods of use.

SUMMARY

As disclosed herein, in a first aspect, a device is disclosed which may comprise: a chamber, a source providing a stream of target material droplets delivering target material to an irradiation region in the chamber along a path between a target material release point and the irradiation region, a gas flow in the to chamber, at least a portion of the gas flowing in a direction toward the droplet stream, a system producing a laser beam irradiating droplets at the irradiation region to generate a plasma producing EUV radiation, and a shroud positioned along a portion of the stream, the shroud having a first shroud portion shielding droplets from the flow and an opposed open portion.

In one embodiment, the shroud has a partial ring-shaped cross-section in a plane normal to the path.

In a particular embodiment, the ring has at least one flat surface.

In one implementation, the shroud is elongated in a direction parallel to the path.

In a particular implementation, the shroud comprises a tube formed with at least one hole.

In one arrangement, the device may further comprise a droplet catch tube positioned along the stream between the shroud and the droplet release point.

In one particular arrangement, the path is non-vertical and the droplet catch tube is a shield protecting the reflective optic from target material straying from the non-vertical path.

In another aspect, also disclosed herein, a device may comprise: a chamber, a source providing a stream of target material droplets delivering target material to an irradiation region in the chamber along a path between the irradiation region and a target material release point, a gas flow in the chamber, a laser producing a beam irradiating droplets at the irradiation region to generate a plasma producing EUV radiation, and a shroud positioned along a portion of the stream, the shroud partially enveloping the stream in a plane normal to the path to increase droplet positional stability.

In one embodiment of this aspect, the shroud has a partial ring-shaped cross-section in a plane normal to the path.

In a particular embodiment, the ring has at least one flat surface.

In a particular implementation of this aspect, the shroud is elongated in a direction parallel to the path.

In a particular implementation of this aspect, the shroud comprises a tube formed with at least one hole.

In one implementation of this aspect, the device may further comprise a droplet catch tube positioned along the stream between the shroud and the droplet release point.

In one particular implementation of this aspect, the path is non-vertical and the droplet catch tube is a shield protecting the reflective optic from target material straying from the non-vertical path.

In another aspect, also disclosed herein, a method may comprise the steps of: providing a stream of target material droplets delivering target material to an irradiation region in a chamber along a path between a target material release point and the irradiation region, flowing a gas in a direction toward the droplet stream, irradiating droplets with a laser beam at the irradiation region to generate a plasma producing EUV radiation, and positioning a shroud along a portion of the stream, the shroud having a first shroud portion shielding droplets from the flow and an opposed open portion.

In a particular implementation of this aspect, the flowing and irradiating steps occur simultaneously.

In one particular implementation of this aspect, the shroud has a partial ring-shaped cross-section in a plane normal to the path.

In one implementation of this aspect, the ring has at least one flat surface.

In a particular implementation of this aspect, the shroud is elongated in a direction parallel to the path.

DETAILED DESCRIPTION

Figure 1:
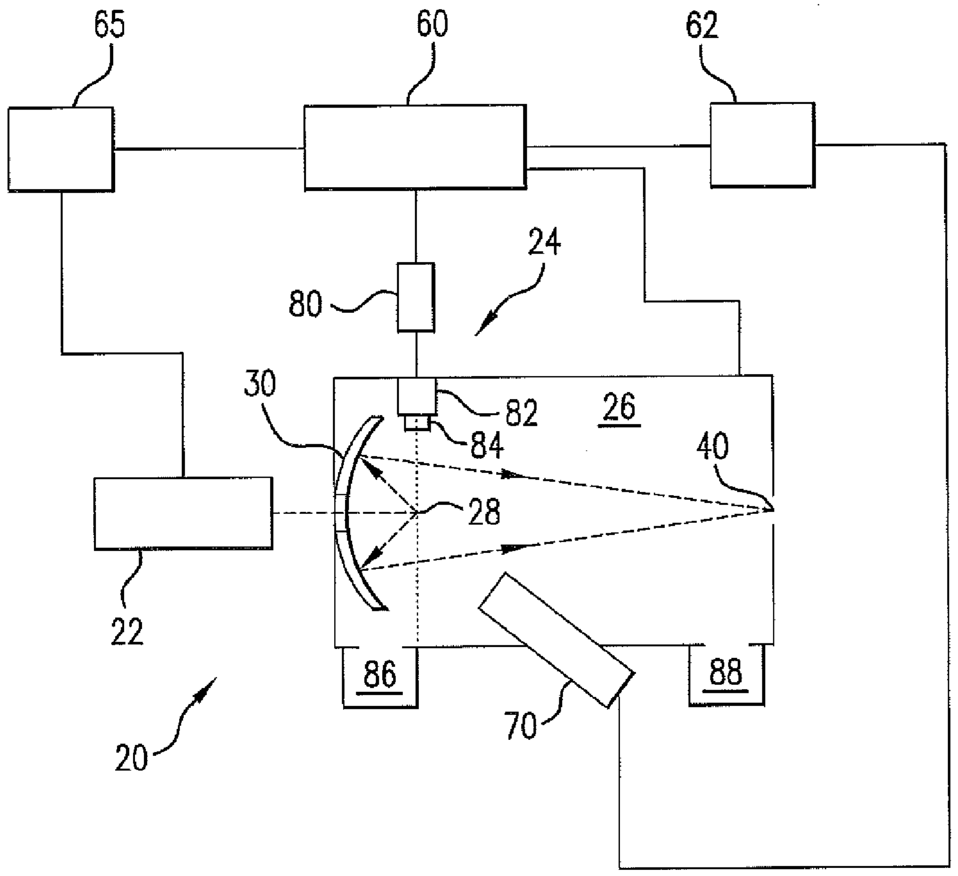
PRIOR ART FIG. 1
FIG. 1 shows a schematic view of an embodiment of a laser-produced-plasma EUV light source.

With initial reference to FIG. 1, there is shown a schematic view of an embodiment of an EUV light source, e.g., a laser-produced-plasma EUV light source 20. As shown in FIG. 1, and described in further detail below, the LPP light source 20 may include a system 22 for generating a train of light pulses and delivering the light pulses into a chamber 26. As detailed below, each light pulse may travel along a beam path from the system 22 and into the chamber 26 to illuminate a respective target droplet at an irradiation region 28.

Suitable lasers for use in the system 22 shown in FIG. 1, may include a pulsed laser device, e.g., a pulsed gas discharge $CO_2$ laser device producing radiation at 9.3 μm or 10.6 μm, e.g., with DC or RF excitation, operating at relatively high power, e.g., 10 kW or higher and high pulse repetition rate, e.g., 50 kHz or more. In one particular implementation, the laser may be an axial-flow RF-pumped $CO_2$ laser having an oscillator-amplifier configuration (e.g. master oscillator/power amplifier (MOPA) or power oscillator/power amplifier (POPA)) with multiple stages of amplification and having a seed pulse that is initiated by a Q-switched oscillator with relatively low energy and high repetition rate, e.g., capable of 100 kHz operation. From the oscillator, the laser pulse may then be amplified, shaped and/or focused before reaching the irradiation region 28. Continuously pumped $CO_2$ amplifiers may be used for the system 22. For example, a suitable $CO_2$ laser device having an oscillator and three amplifiers (O-PA1-PA2-PA3 configuration) is disclosed in U.S. patent application Ser. No. 11/174,299 filed on Jun. 29, 2005, entitled, LPP EUV LIGHT SOURCE DRIVE LASER SYSTEM, now U.S. Pat. No. 7,439,530, issued on Oct. 21, 2008, the entire contents of which are hereby incorporated by reference herein. Alternatively, the laser may be configured as a so-called "self-targeting" laser system in which the droplet serves as one mirror of the optical cavity. In some "self-targeting" arrangements, an oscillator may not be required. Self-targeting laser systems are disclosed and claimed in U.S. patent application Ser. No. 11/580,414 filed on Oct. 13, 2006, entitled, DRIVE LASER DELIVERY SYSTEMS FOR EUV LIGHT SOURCE, now U.S. Pat. No. 7,491,954, issued on Feb. 17, 2009, the entire contents of which are hereby incorporated by reference herein.

Depending on the application, other types of lasers may also be suitable, e.g., an excimer or molecular fluorine laser operating at high power and high pulse repetition rate. Other examples include, a solid state laser, e.g., having a fiber, rod, slab or disk-shaped active media, other laser architectures having one or more chambers, e.g., an oscillator chamber and one or more amplifying chambers (with the amplifying chambers in parallel or in series), a master oscillator/power oscillator (MOPO) arrangement, a master oscillator/power ring amplifier (MOPRA) arrangement, or a solid state laser that seeds one or more excimer, molecular fluorine or $CO_2$ amplifier or oscillator chambers, may be suitable. Other designs may be suitable.

As further shown in FIG. 1, the EUV light source 20 may also include a target material delivery system 24, e.g., delivering droplets of a target material into the interior of a chamber 26 to the irradiation region 28, where the droplets will interact with one or more light pulses, e.g., zero, one or more pre-pulses and thereafter one or more main pulses, to ultimately produce a plasma and generate an EUV emission. The target material may include, but is not necessarily limited to, a material that includes tin, lithium, xenon or combinations thereof. The EUV emitting element, e.g., tin, lithium, xenon, etc., may be in the form of liquid droplets and/or solid particles contained within liquid droplets. For example, the element tin may be used as pure tin, as a tin compound, e.g., $SnBr_4$, $SnBr_2$, $SnH_4$, as a tin alloy, e.g., tin-gallium alloys, tin-indium alloys, tin-indium-gallium alloys, or a combination thereof. Depending on the material used, the target material may be presented to the irradiation region 28 at various temperatures including room temperature or near room temperature (e.g., tin alloys, $SnBr_4$), at an elevated temperature, (e.g., pure tin) or at temperatures below room temperature, (e.g., $SnH_4$), and in some cases, can be relatively volatile, e.g., $SnBr_4$. More details concerning the use of these materials in an LPP EUV light source is provided in U.S. patent application Ser. No. 11/406,216, filed on Apr. 17, 2006, entitled ALTERNATIVE FUELS FOR EUV LIGHT SOURCE, now U.S. Pat. No. 7,465,946, issued on Dec. 16, 2008, the contents of which are hereby incorporated by reference herein.

Continuing with FIG. 1, the EUV light source 20 may also include an optic 30, e.g., a near-normal incidence collector mirror having a reflective surface in the form of a prolate spheroid (i.e., an ellipse rotated about its major axis) having, e.g., a graded multi-layer coating with alternating layers of Molybdenum and Silicon, and in some cases one or more high temperature diffusion barrier layers, smoothing layers, capping layers and/or etch stop layers. FIG. 1 shows that the optic 30 may be formed with an aperture to allow the light pulses generated by the system 22 to pass through and reach the irradiation region 28. As shown, the optic 30 may be, e.g., a prolate spheroid mirror that has a first focus within or near the irradiation region 28 and a second focus at a so-called intermediate region 40, where the EUV light may be output from the EUV light source 20 and input to a device utilizing EUV light, e.g., an integrated circuit lithography tool (not shown). It is to be appreciated that other optics may be used in place of the prolate spheroid mirror for collecting and directing light to an intermediate location for subsequent delivery to a device utilizing EUV light, for example, the optic may be a parabola rotated about its major axis or may be configured to deliver a beam having a ring-shaped cross-section to an intermediate location, see e.g., U.S. patent application Ser. No. 11/505,177, filed on Aug. 16, 2006, entitled EUV OPTICS, now U.S. Pat. No. 7,843,632, issued on Nov. 30, 2010, the contents of which are hereby incorporated by reference.

Continuing with reference to FIG. 1, the EUV light source 20 may also include an EUV controller 60, which may also include a firing control system 65 for triggering one or more lamps and/or laser devices in the system 22 to thereby generate light pulses for delivery into the chamber 26. The EUV light source 20 may also include a droplet position detection system which may include one or more droplet imagers 70 e.g., system(s) for capturing images using CCD's and/or backlight stroboscopic illumination and/or light curtains that provide an output indicative of the position and/or timing of one or more droplets, e.g., relative to the irradiation region 28. The imager(s) 70 may provide this output to a droplet position detection feedback system 62, which can, e.g., compute a droplet position and trajectory, from which a droplet error can be computed, e.g., on a droplet-by-droplet basis, or on average. The droplet position error may then be provided as an input to the controller 60, which can, for example, provide a position, direction and/or timing correction signal to the system 22 to control a source timing circuit and/or to control a beam position and shaping system, e.g., to change the trajectory and/or focal power of the light pulses being delivered to the irradiation region 28 in the chamber 26. Further details are provided in, see e.g., U.S. patent application Ser. No. 10/803,526, filed on Mar. 17, 2004, entitled A HIGH REPETITION RATE LASER PRODUCED PLASMA EUV LIGHT SOURCE, now U.S. Pat. No. 7,087,914, issued on Aug. 8, 2006; and/or U.S. Ser. No. 10/900,839 filed on Jul. 27, 2004, entitled EUV LIGHT SOURCE, now U.S. Pat. No. 7,164,144, issued on Jan. 16, 2007, the contents of each of which are hereby incorporated by reference.

The EUV light source 20 may include one or more EUV metrology instruments for measuring various properties of the EUV light generated by the source 20. These properties may include, for example, intensity (e.g., total intensity or intensity within a particular spectral band), spectral bandwidth, polarization, beam position, pointing, etc. For the EUV light source 20, the instrument(s) may be configured to operate while the downstream tool, e.g., photolithography scanner, is on-line, e.g., by sampling a portion of the EUV output, e.g., using a pickoff mirror or sampling "uncollected" EUV light, and/or may operate while the downstream tool, e.g., photolithography scanner, is off-line, for example, by measuring the entire EUV output of the BUY light source 20.

As further shown in FIG. 1, the EUV light source 20 may include a droplet control system 80, operable in response to a signal (which in some implementations may include the droplet error described above, or some quantity derived therefrom) from the controller 60, to e.g., modify the release point of the target material from a source material dispenser 82 and/or modify droplet formation timing, to correct for errors in the droplets arriving at the desired irradiation region 28, and/or synchronize the generation of droplets with the pulsed laser system 22.

FIG. 1 also schematically illustrates that the EUV light source 20 may include a shroud 84 for increasing droplet positional stability, i.e., as used herein, the term "droplet positional stability" and its derivatives means a measure of variation in path between a droplet and a successive droplet, as each droplet travels over some or all of the distance between a droplet release point and an irradiation region. Examples of shrouds suitable for use in the EUV light source 20 include, but are not necessarily limited to, shrouds 320 (FIG. 4), 320' (FIG. 7), 320" (FIG. 8), 320''' (FIG. 9), as described below.

One somewhat qualitative measure of "droplet positional stability" involves passing a diagnostic laser beam, e.g. laser diode, e.g. having a field of about 1-2 mm through a portion of a droplet stream and onto a camera. In one such setup, a camera having a frame rate of 20 hz was used in conjunction with a diagnostic laser producing output light pulses at 20 hz to evaluate a droplet stream having 40,000 droplets per second passing through the field. With the frame rate synchronized with the phase of the droplet generator, a qualitative measure of "droplet positional stability" can be obtained by viewing the frames as a video. Specifically, with this technique, perfect "droplet positional stability" (if obtainable) would appear as a non-moving droplet in the video, i.e., a static image that does not change over time. On the other hand, a droplet stream that is highly unstable appears as a droplet that moves noticeable about a point on the screen.

FIG. 1 also schematically illustrates that one or more gases such as $H_2$, hydrogen radicals, He, Ar, HBr, HCl or combinations thereof, may be introduced into the chamber 26 via port 86, and exhausted therefrom using port 88. These gases may be used in the chamber 26, for example, for slowing fast moving ions generated by the LPP plasma to protect nearby optics, for debris mitigation including, but not limited to, blowing vapor and other debris away from an optic or other component, optic cleaning, such as etching or chemically altering a material the has deposited on an optic, or component and/or thermal control, such as removing heat from a particular optic/component, or to remove heat generally from the chamber. In some cases, these gases may be flowing, for example, to move plasma generated debris, such as vapor and/or microparticles in a desired direction, move heat toward a chamber exit, etc. In some cases, these flows may occur during LPP plasma production. Other setups may call for the use of non-flowing, i.e., static or nearly static, gases. As used herein, the term "static gas" means a gas in a volume which is not in fluid communication with an active pump. In some implementations, gases may be static during LPP plasma production and caused to flow between periods of LPP plasma production, e.g., flow may only occur between bursts of EUV light output. The presence of these gasses, whether static or flowing and/or the creation/existence of the LPP plasma may alter/effect each droplet as it travels to the irradiation region adversely affecting droplet positional stability.

Further details regarding directional flows of chamber gases are provided below with reference to FIG. 10.

Further details regarding the use of gases in a LPP plasma chamber may be found in U.S. Ser. No. 11/786,145, filed on Apr. 10, 2007, entitled LASER PRODUCED PLASMA EUV LIGHT SOURCE, now U.S. Pat. No. 7,671,349, issued on Mar. 2, 2010; U.S. Ser. No. 12/214,736 filed on Jun. 19, 2008, entitled SYSTEMS AND METHODS FOR TARGET MATERIAL DELIVERY IN A LASER PRODUCED PLASMA EUV LIGHT SOURCE, now U.S. Pat. No. 7,872, 245, issued on Jan. 18, 2011; U.S. Ser. No. 11/897,644, filed on Aug. 31, 2007, entitled GAS MANAGEMENT SYSTEM FOR A LASER PRODUCED PLASMA EUV LIGHT SOURCE, now U.S. Pat. No. 7,655,925, issued on Feb. 20, 2010; and U.S. Ser. No. 10/409,254, filed on Apr. 8, 2003, now U.S. Pat. No. 6,972,421, issued on Dec. 6, 2005; each of which is hereby incorporated by reference herein in its entirety.

Figure 2:
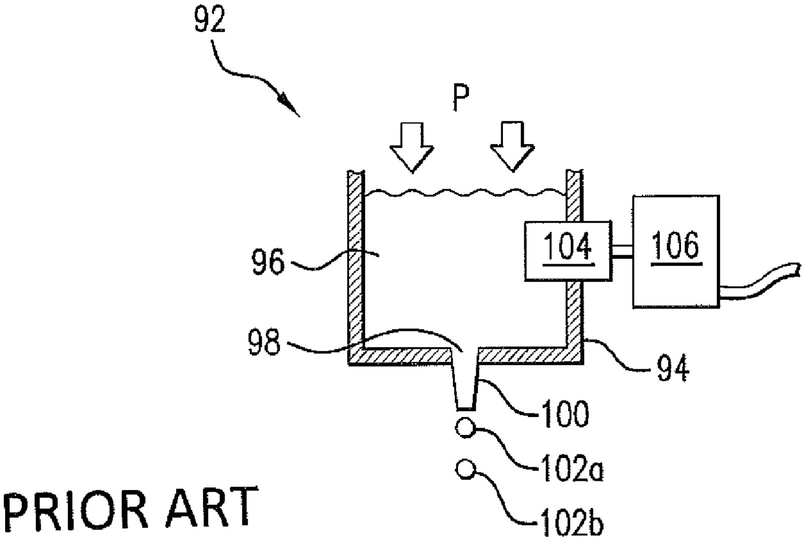
PRIOR ART FIG. 2
FIG. 2 shows a simplified schematic view of a source material dispenser.

FIG. 2 illustrates in schematic format the components of a simplified source material dispenser 92 that may be used in some or all of the embodiments described herein. As shown there, the source material dispenser 92 may include a conduit, which for the case shown, is a reservoir 94 holding a fluid 96, e.g., molten tin, under pressure, P. Also shown, the reservoir 94 may be formed with an orifice 98 allowing the pressurized fluid 96 to flow through the orifice establishing a continuous stream 100 which subsequently breaks into a plurality of droplets 102*a, b.*

Continuing with FIG. 2, the source material dispenser 92 further includes a sub-system producing a disturbance in the fluid having an electro-actuatable element 104 that is operably coupled with the fluid 98 and a signal generator 106 driving the electro-actuatable element 104. In one setup, a fluid is forced to flow from a reservoir under pressure through a conduit, e.g., capillary tube, having a relatively small diameter and a length of about 10 to 50 mm, creating a continuous stream exiting an orifice of the conduit, which subsequently breaks up into droplets and an electro-actuatable element, e.g., having a ring-like or tube-like shape, may be positioned around the tube. When driven, the electro-actuatable element may selectively squeeze the conduit to disturb the stream More details regarding various droplet dispenser configurations and their relative advantages may be found in U.S. Ser. No. 12/214,736, filed on Jun. 19, 2008, entitled SYSTEMS AND METHODS FOR TARGET MATERIAL DELIVERY IN A LASER PRODUCED PLASMA EUV LIGHT SOURCE, now U.S. Pat. No. 7,872,245, issued on Jan. 18, 2011; U.S. patent application Ser. No. 11/827,803, filed on Jul. 13, 2007, entitled LASER PRODUCED PLASMA EUV LIGHT SOURCE HAVING A DROPLET STREAM PRODUCED USING A MODULATED DISTURBANCE WAVE, now U.S. Pat. No. 7,897,947, issued on Mar. 1, 2011; U.S. patent application Ser. No. 11/358,988, filed on Feb. 21, 2006, entitled LASER PRODUCED PLASMA EUV LIGHT SOURCE WITH PRE-PULSE, and published on Nov. 16, 2006 as US2006/0255298A-1; U.S. patent application Ser. No. 11/067,124, filed on Feb. 25, 2005, entitled METHOD AND APPARATUS FOR EUV PLASMA SOURCE TARGET DELIVERY, now U.S. Pat. No. 7,405,416, issued on Jul. 29, 2008; and U.S. patent application Ser. No. 11/174,443, filed on Jun. 29, 2005, entitled LPP EUV PLASMA SOURCE MATERIAL TARGET DELIVERY SYSTEM, now U.S. Pat. No. 7,372,056, issued on May 13, 2008; the contents of each of which are hereby incorporated by reference.

Figure 3:
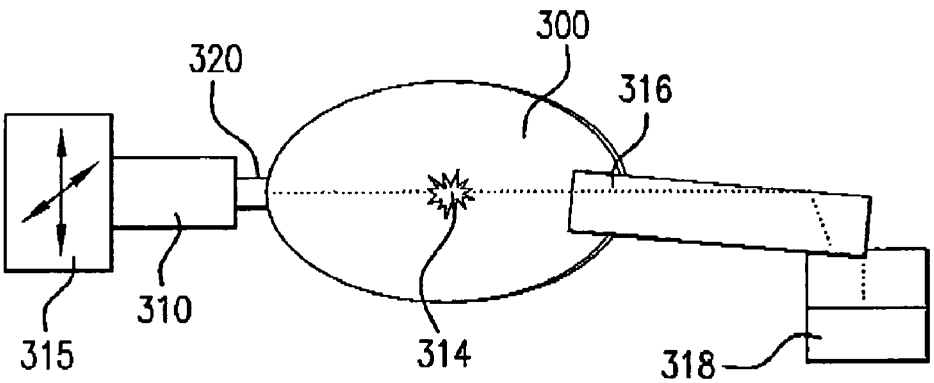
FIG. 3 shows a simplified, diagram showing a shroud positioned along a portion of a droplet stream with the shroud partially enveloping the stream in a plane normal to the droplet stream path direction to increase droplet positional stability.

Referring now to FIG. 3, a device is shown having an EUV reflective optic 300, e.g., a near-normal incidence collector mirror having a reflective surface in the form of a rotated ellipse having, e.g., a graded multi-layer coating with alternating layers of Molybdenum and Silicon, and in some cases, one or more high temperature diffusion barrier layers, smoothing layers, capping layers and/or etch stop layers. FIG. 3 also shows that the device may further include a system delivering target material 310, e.g., a stream of target material droplets, the system having a target material release point. A system generating a laser beam (see FIG. 1) may also be provided for irradiating the target material at an irradiation region 314 to generate an EUV emission. As shown in FIG. 3, the system delivering target material 310 can be mounted on a steering mechanism 315 capable of tilting the system delivering target material 310 in different directions to adjust the position of the droplets, with respect to the focal point of the collector mirror, and may also translate the droplet generator in small increments along the stream axis. As further shown in FIG. 3, the droplets that are not used for the creation of plasma and the material exposed to the laser irradiation and deflected from the straight path are allowed to travel some distance beyond the irradiation region 314 and are intercepted by a catch, which for the case shown includes a structure, e.g., elongated tube 316 (having a cross-section that is circular, oblong, oval, rectangular, square, etc.). In more detail, elongated tube 316 may be positioned to receive target material that has passed through the irradiation region and prevent received material from splashing and reaching the reflective optic. In some cases, the effects of splashing may be reduced/prevented by using a tube having a relatively large aspect ratio L/W, e.g. greater than about 3, where L is the tube length and W is the largest inside tube dimension normal to L. Upon striking the inner wall of the tube 316, the target material droplets lose their velocity and the target material may then be collected in a dedicated vessel 318, as shown.

FIG. 3 also shows that a shroud 320 may be positioned along a portion of said stream with the shroud partially enveloping the stream in a plane normal to path direction to increase droplet positional stability.

Figure 4:
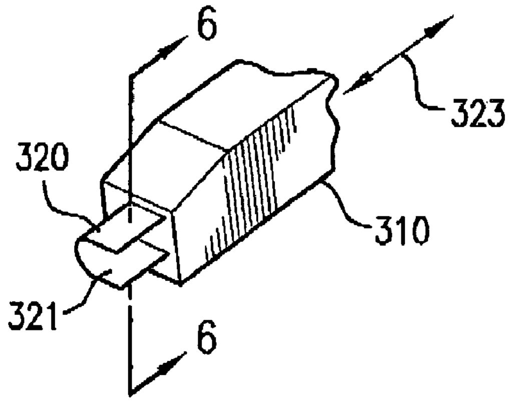
FIG. 4 shows a perspective view of a shroud mounted on a system delivering target material and positioned to extend therefrom toward the irradiation region.

FIG. 4 shows a perspective view of the shroud 320. As shown, the shroud 320 may be mounted on system delivering target material 310 and positioned to extend therefrom toward the irradiation region. FIG. 4 shows that the shroud may be formed with a lateral shroud opening 321 extending in the direction of arrow 323.

Figure 5:
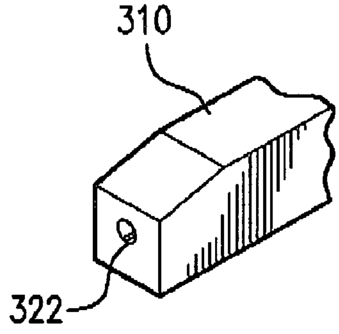
FIG. 5 shows a perspective view of a system delivering target material having a droplet stream output orifice.

FIG. 5 shows a portion of a system delivering target material 310 having a droplet stream output orifice 322. Comparing FIGS. 4 and 5, it can be seen that the shroud 320 may partially surround the droplet stream output orifice 322.

Figure 6:
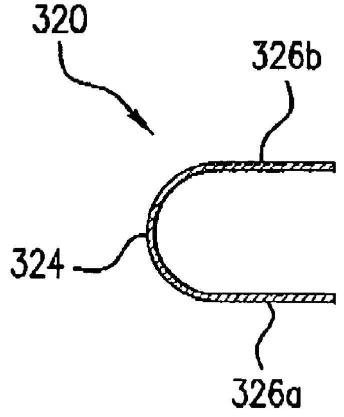
FIG. 6 shows a sectional view of an embodiment of a shroud shaped as a partial ring having an curved region and flat extensions as seen along line 6-6 in FIG. 4.

FIG. 6 shows a sectional view of a shroud 320. As seen there, the shroud 320 may be shaped as a partial ring, including a "U" shaped cross-section having an curved region 324 and flat extensions 326*a,b*. For example, the shroud may be made of molybdenum or stainless steel (e.g., 316 stainless) and may extend about 30 mm from the droplet stream output orifice 322.

Figure 7:
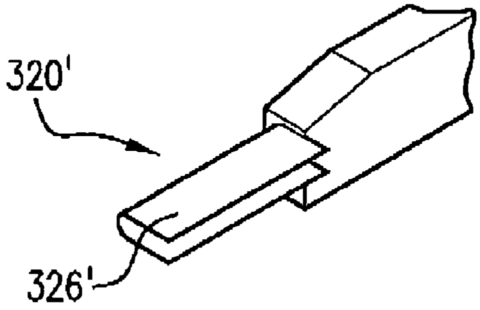
FIG. 7 shows another embodiment of a shroud.

FIG. 7 shows another embodiment of a shroud 320' for use in the EUV light source 20 having a longer extension length (e.g. an extension of about 150 mm from the droplet stream output orifice 322 and longer flat surfaces 326').

Figure 8:
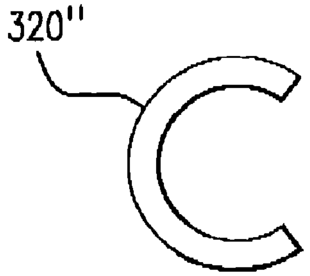
FIG. 8 shows another embodiment of a shroud having a C-shaped cross-section.

FIG. 8 shows another embodiment of a shroud 320" for use in the EUV light source 20 having a C-shaped section as seen along line 6-6 in FIG. 4.

Figure 9:
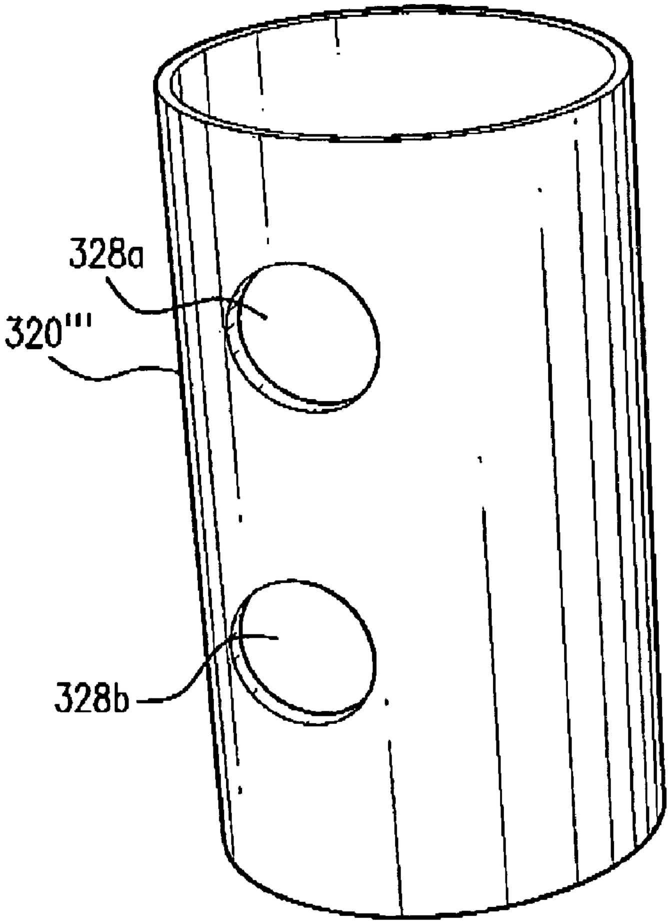
FIG. 9 shows another embodiment of a shroud having tube shape formed with one or more through-holes.

FIG. 9 shows another embodiment of a shroud 320'" for use in the EUV light source 20 having tube shape formed with one or more through-holes 328*a,b* extending through the wall of the tube.

Figure 10:
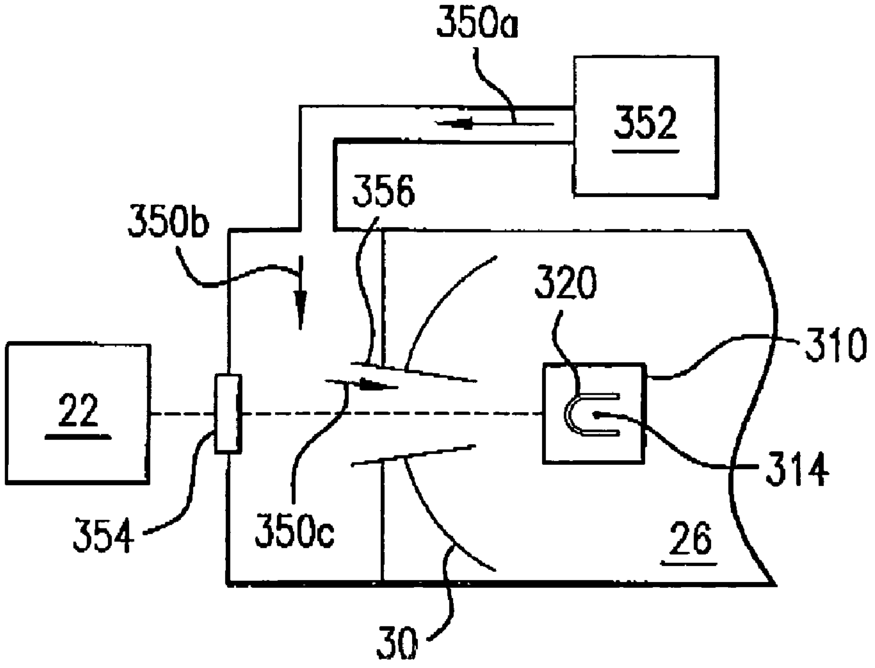
FIG. 10 illustrates a suitable orientation for a shroud relative to a gas flow from a gas source in a chamber.

FIG. 10 illustrates a suitable orientation for a shroud 320 relative to a gas flow (indicated by arrows 350*a,b,c*) from a gas source 352 in the chamber 26. As shown in this embodiment, gas flows through an aperture in the collector mirror and toward irradiation site 314. It can also be seen that light from laser system 22 passes into chamber 26 through window 354 and through the aperture in the collector mirror to the irradiation site 314. An optional conical member 356 may be provided to guide flow through the collector mirror aperture, as shown. FIG. 10 shows that the shroud 320 may be oriented with the lateral shroud opening positioned downstream of the gas flow.

Figure 11:
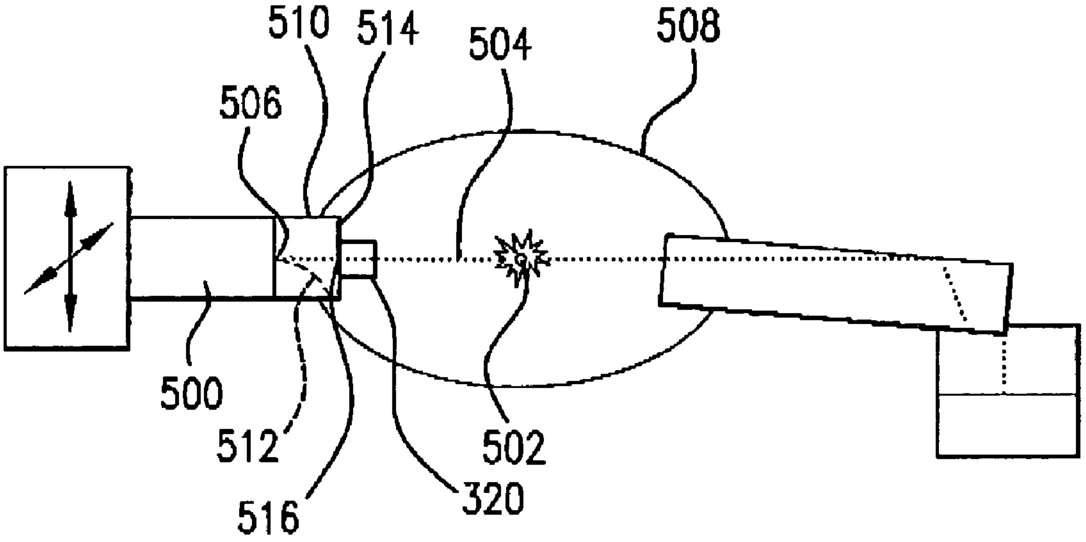
FIG. 11 shows a device having a source of target material droplets, a droplet catch tube and a shroud.

FIG. 11 shows a device having a source of target material droplets 500 delivering target material to an irradiation region 502 along a path 504 between the irradiation region 502, and a target material release point 506. As shown, the device may also include an EUV reflective optic 508, (e.g., as described above for optic 300) and a droplet catch tube 510 to receive target material straying from the desired path, e.g., material along path 512. In use, the droplet catch tube 510 may remain in position during irradiation of target material to generate EUV light (i.e., may remain installed during normal light source operation).

As further shown, the droplet catch tube 510 may extend from a location wherein the tube at least partially surrounds the target material release point 506 to a tube terminus 514 that is positioned between the release point 506 and the irradiation region 502. Also shown, the droplet catch tube 510 may have a closed end at the terminus that is formed with an opening 516 centered along the desired path 504. With this arrangement, target material traveling along the path 504 will exit droplet catch tube 510, while target material straying from path 504 will be captured and held in closed-end tube 510.

While the particular embodiment(s) described and illustrated in this patent application in the detail required to satisfy 35 U.S.C. §112, are fully capable of attaining one or more of the above-described purposes for, problems to be solved by, or any other reasons for, or objects of the embodiment(s) described above, it is to be understood by those skilled in the art that the above-described embodiment(s) are merely exemplary, illustrative and representative of the subject matter which is broadly contemplated by the present application. Reference to an element in the following Claims in the singular, is not intended to mean, nor shall it mean in interpreting such Claim element "one and only one" unless explicitly so stated, but rather "one or more". All structural and functional equivalents to any of the elements of the above-described embodiment(s) that are known, or later come to be known to those of ordinary skill in the art, are expressly incorporated herein by reference and are intended to be encompassed by the present Claims. Any term used in the Specification and/or in the Claims, and expressly given a meaning in the Specification and/or Claims in the present Application, shall have that meaning, regardless of any dictionary or other commonly used meaning for such a term. It is not intended or necessary for a device or method discussed in the Specification as an embodiment, to address or solve each and every problem discussed in this Application, for it to be encompassed by the present Claims. No element, component, or method step in the present disclosure is intended to be dedicated to the public regardless of whether the element, component, or method step is explicitly recited in the Claims. No claim element in the appended Claims is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A device comprising:

a chamber;

a source providing a stream of target material delivering target material to an irradiation region in the chamber along a path between a target material release point and the irradiation region;

a gas flow in the chamber, at least a portion of the gas flowing in a direction toward the stream;

a system producing a laser beam irradiating target material at the irradiation region to generate a plasma producing EUV radiation; and a shroud positioned along a portion of said stream, said shroud having a first shroud portion shielding the stream from said flow and an opposed open portion.

2. A device as recited in claim 1 wherein said shroud has a partial ring-shaped cross-section in a plane normal to said path.

3. A device as recited in claim 2 wherein said ring has at least one flat surface.

4. A device as recited in claim 1 wherein the shroud is elongated in a direction parallel to said path.

5. A device as recited in claim 1 wherein said shroud comprises a tube formed with at least one hole.

6. A device as recited in claim 1 further comprising a droplet catch tube positioned along said stream between said shroud and said target material release point.

7. A device as recited in claim 6 wherein said path is non-vertical and said droplet catch tube is a shield protecting the reflective optic from target material straying from the non-vertical path.

8. A device comprising:

a chamber;

a source providing a stream of target material droplets delivering target material to an irradiation region in the chamber along a path between the irradiation region and a target material release point;

a gas flow in the chamber;

a laser producing a beam irradiating droplets at the irradiation region to generate a plasma producing EUV radiation; and a shroud positioned along a portion of said stream, said shroud partially enveloping said stream in a plane normal to said path to increase droplet positional stability.

9. A device as recited in claim 8 wherein said shroud has a partial ring-shaped cross-section in a plane normal to said path.

10. A device as recited in claim 9 wherein said ring has at least one flat surface.

11. A device as recited in claim 8 wherein the shroud is elongated in a direction parallel to said path.

12. A device as recited in claim 8 wherein said shroud comprises a tube formed with at least one hole.

13. A device as recited in claim 8 further comprising a droplet catch tube positioned along said stream between said shroud and said target material release point.

14. A device as recited in claim 13 wherein said path is non-vertical and said droplet catch tube is a shield protecting the reflective optic from target material straying from the non-vertical path.

15. A method comprising the steps of:

providing a stream of target material droplets delivering target material to an irradiation region in a chamber along a path between a target material release point and the irradiation region;

flowing a gas in a direction toward the droplet stream;

irradiating droplets with a laser beam at the irradiation region to generate a plasma producing EUV radiation; and positioning a shroud along a portion of said stream, said shroud having a first shroud portion shielding droplets from said flow and an opposed open portion.

16. A method as recited in claim 15 wherein said flowing and irradiating steps occur simultaneously.

17. A method as recited in claim 15 wherein said shroud has a partial ring shaped cross section in a plane normal to said path.

18. A method as recited in claim 15 wherein said ring has at least one flat surface.

19. A method as recited in claim 15 wherein the shroud is elongated in a direction parallel to said path.

20. A method as recited in claim 15 further comprising the step of positioning a droplet catch tube along said stream between said shroud and said target material release point.

21. A device as recited in claim 1 wherein at least a portion of said stream is a droplet stream.

* * * * *